US009571489B2

(12) United States Patent
Sugiyama et al.

(10) Patent No.: US 9,571,489 B2
(45) Date of Patent: Feb. 14, 2017

(54) SYSTEM AND METHOD FOR PERFORMING COMMANDS FROM A REMOTE SOURCE

(75) Inventors: Nobukazu Sugiyama, San Diego, CA (US); Kai Liu, San Diego, CA (US); Ludovic Douillet, Escondido, CA (US); Lobrenzo Wingo, San Diego, CA (US)

(73) Assignee: Sony Corporation, Tokyo (JP)

( * ) Notice: Subject to any disclaimer, the term of this patent is extended or adjusted under 35 U.S.C. 154(b) by 530 days.

(21) Appl. No.: 13/209,212

(22) Filed: Aug. 12, 2011

(65) Prior Publication Data

US 2013/0038425 A1    Feb. 14, 2013

(51) Int. Cl.
*H04L 29/06* (2006.01)
*G06F 21/57* (2013.01)

(52) U.S. Cl.
CPC ......... *H04L 63/0853* (2013.01); *G06F 21/572* (2013.01); *H04L 63/083* (2013.01); *H04L 63/168* (2013.01)

(58) Field of Classification Search
CPC .................................................. H04L 63/0853
USPC ..................................................... 726/26–30
See application file for complete search history.

(56) References Cited

U.S. PATENT DOCUMENTS

| 7,881,745 | B1  |   2/2011 | Rao et al. |              |
|-----------|-----|----------|-----------|---------------|
| 8,966,226 | B2* |   2/2015 | Conti ..................... | G06F 21/82 |
|           |     |          |           | 712/220       |
| 2002/0191619 | A1* | 12/2002 | Shafer ..................... | H04L 45/56 |
|              |     |          |           | 370/401       |
| 2003/0046370 | A1* |  3/2003 | Courtney ............ | H04L 41/0266 |
|              |     |          |           | 709/220       |
| 2004/0237036 | A1* | 11/2004 | Qulst ...................... | H04L 67/02 |
|              |     |          |           | 715/236       |
| 2005/0063317 | A1* |  3/2005 | Risberg ................... | H04L 41/12 |
|              |     |          |           | 370/254       |
| 2005/0113070 | A1* |  5/2005 | Okabe .................... | H04W 12/08 |
|              |     |          |           | 455/411       |
| 2005/0172137 | A1* |  8/2005 | Hopkins ................ | G06Q 20/02 |
|              |     |          |           | 713/185       |
| 2006/0230265 | A1* | 10/2006 | Krishna .................. | H04L 63/08 |
|              |     |          |           | 713/158       |
| 2007/0293194 | A1* | 12/2007 | Bisht ................. | H04M 1/72533 |
|              |     |          |           | 455/411       |

(Continued)

FOREIGN PATENT DOCUMENTS

| CN | WO/2011029303 |  * | 3/2011 | ...................... 725/47 |
|----|---------------|----|--------|----|
| EP |      1645931  |    | 4/2006 |    |

(Continued)

OTHER PUBLICATIONS

O'Gorman, L. "Comparing passwords, tokens, and biometrics for user authentication,"Proceedings of the IEEE Year: 2003, vol. 91, Issue: 12 pp. 2021-2040.*

(Continued)

*Primary Examiner* — Roderick Tolentino
(74) *Attorney, Agent, or Firm* — John L. Rogitz

(57) ABSTRACT

According to one embodiment of the invention, a method for secured execution of commands is described. Initially, a second electronic device authenticates a first electronic device and registers the first electronic device as a trusted device. Thereafter, up receipt of a message with one or more embedded commands, such commands are executed without any pre-established communication protocol if the message is from the registered first electronic device.

13 Claims, 3 Drawing Sheets

(56) References Cited

U.S. PATENT DOCUMENTS

| | | | | |
|---|---|---|---|---|
| 2008/0056213 | A1* | 3/2008 | Kao | H04W 48/14 370/338 |
| 2008/0317004 | A1* | 12/2008 | Cai | H04L 41/0806 370/352 |
| 2009/0222811 | A1* | 9/2009 | Faus | G06F 8/65 717/173 |
| 2009/0259854 | A1* | 10/2009 | Cox | G06F 21/575 713/189 |
| 2010/0053475 | A1* | 3/2010 | Han | H04N 9/3141 348/744 |
| 2011/0055905 | A1 | 3/2011 | Sakuramoto | |
| 2011/0172842 | A1* | 7/2011 | Makhota | H02J 1/00 700/292 |
| 2011/0179278 | A1* | 7/2011 | Kim | G06F 21/33 713/175 |
| 2012/0174160 | A1* | 7/2012 | Xu | H04N 7/17318 725/47 |

FOREIGN PATENT DOCUMENTS

| | | |
|---|---|---|
| KR | 1020060095074 | 8/2006 |
| KR | 100652999 | 12/2006 |

OTHER PUBLICATIONS

Dellutri et al., "Local Authentication with Bluetooth enabled Mobile Devices," Joint International Conference on Autonomic and Autonomous Systems and International Conference on Networking and Services—(icas-isns'05) Year: 2005 pp. 72-72.*

Korean Patent Application No. 10-2012-81629, Notice of Preliminary Rejection, mailed Oct. 22, 2013, (with English Translation).

* cited by examiner

COMMAND TYPE: Power-Down
Power-On
Software Update

CMD_ denotes embedded command in XML file "filename"

SYSTEM AND METHOD FOR PERFORMING COMMANDS FROM A REMOTE SOURCE

BACKGROUND

Field

Embodiments of the invention relate to the field of secured communications. More specifically, one embodiment of the invention relates to a system and method for embedding commands within a message where any embedded command is processed upon confirmation that the message originated from an authenticated electronic device.

General Background

For the last decade, major advancements in high-technology have occurred, and such advancements continue to occur at an accelerated pace. As a result, product development cycles have become increasingly shorter over the years, which have posed a number of problems.

For instance, one problem is that, by needing to release products at a greater pace in order to compete in the marketplace, there are times when the released product does not have all of its intended features. Hence, it has become increasingly important to be able to have rudimentary control over an electronic product after release, such as being able to expand and upgrade the electronic product over the Internet.

As an example, in accordance with conventional communications schemes, servers are authorized to only send certain commands for remote control of clients, namely those commands that are provided in accordance with a communication protocol agreed upon by the servers and clients beforehand. For instance, software updates may require a particular protocol to be followed prior to execution of the command, where the command is unable to execute if the protocol cannot be performed.

Likewise, security protections, such as security codes, may be used to prevent unauthorized commands from being utilized. However, these security codes, once broken, expose the device to unauthorized control by a server.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
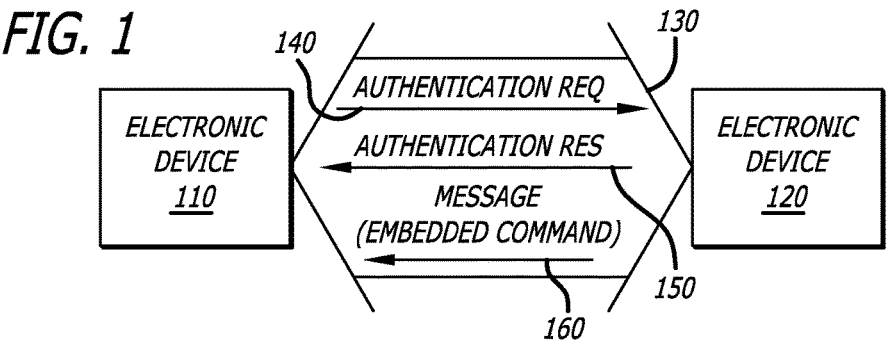
FIG. 1 is a first exemplary diagram of registration operations and transmissions of a message including an embedded command between two electronic devices after successful registration.

Various embodiments of the invention relate to a system and method for confirming the authenticity of a remote source transmitting a message with an embedded command originating and performing that command after authentication has been successfully completed. According to one embodiment of the invention, implemented within an electronic device, logic is configured to generate a unique identifier that is used to produce another value referred to as a Personal Identification Number "PIN" code. The PIN code is used to confirm device authentication. Upon detecting a message with an embedded command and determines that the source has been authenticated, the recipient electronic device is configured to process the embedded command.

This system and method may be utilized in a number of capacities. For instance, the system may support software updates where a client electronic device (television) supports Extensible Messaging and Presence Protocol "XMPP" (chat feature). A server can be used to push messages with commands for software updates without receiving inquiry messages from the television. The television verifies the PIN code provided by the server, and if compares, runs the command that causes the television to download update software (or patches) to its local storage and restart to install the update software.

Alternatively, the system may require the client electronic device (television) to initiate an inquiry message to a centralized source (call or tech center) that has been previously authenticated. A representative at the centralized source may check the PIN code of the television, and if listed, download history and data from the television. Thereafter, the centralized source sends update software (or patches) to the television for local storage and prompts, by use of an embedded command, the restart of the television to install the update software.

In the following description, certain terminology is used to describe features of the invention. For instance, the term "electronic device" may refer to a device that features one or more electrical components that are adapted to receive and process transmitted information. For instance, an electronic device may include, but is not limited or restricted to a television, a set-top box, a personal digital assistant (PDA), a computer (e.g., mobile, personal, server, mainframe, etc.), a cellular telephone, a video game console, a portable video player, or the like.

The terms "unit" and "logic" are representative of hardware and/or software configured to perform one or more functions. For instance, examples of hardware include, but are not limited or restricted to an integrated circuit such as a processor (e.g., a digital signal processor, microprocessor, application specific integrated circuit, a micro-controller, etc.). Of course, the hardware may be alternatively implemented as a finite state machine, a programmable circuit, or even combinatorial logic.

An example of "software" includes executable code in the form of an application, an applet, a routine or even a series of instructions. The software may be stored in any type of non-transitory machine readable medium such as a programmable circuit, a semiconductor memory device such as volatile memory (e.g., random access memory, etc.) and/or non-volatile memory (e.g., any type of read-only memory "ROM", flash memory, etc.), a hard drive disk, a portable storage device (e.g., an optical disk, a digital tape, a flash drive, etc.), or the like.

The term "interconnect" is generally defined as an information-carrying pathway for information, where the information may be content such as video, audio, text, displayable images or any combination thereof. An interconnect may be established using any communication medium such as a wired physical medium (e.g., a bus, one or more electrical wires, trace, cable, etc.) or a wireless medium (e.g., air in combination with wireless signaling technology).

Lastly, the term "value" is a series of bits representative of a number or an alphanumeric character string, and a "message" is information normally in a structured format such as a frame, a packet or a cell. The message normally includes a header portion and a payload portion.

While this invention is susceptible to embodiments of many different forms, there is shown in the drawings and will herein be described in detail specific embodiments, with the understanding that the present disclosure is to be considered as an example of the principles of the invention and not intended to limit the invention to the specific embodiments shown and described.

Referring to FIG. 1, a first exemplary diagram of a communication system 100 consistent with certain embodiments of the invention is shown. Communication system 100 comprises a first electronic device 110 that is adapted to receive digital content (e.g. video, audio, images, web pages, etc.) from a second electronic device 120. The digital content may be propagated as a digital data stream for example in compliance with any data compression scheme. Examples of a data compression scheme include, but are not limited or restricted to a Motion Picture Experts Group (MPEG) standard.

Besides digital content, messages with embedded commands may be transmitted from second electronic device 120 to first electronic device 110 without any prior agreement between devices 110 and 120 on the protocol or the commands themselves. This provides greater flexibility than the conventional communication scheme described above, perhaps such flexibility as command-line shells would provide.

These messages are designed to allow a remotely located electronic device (e.g., second electronic device 120) to control the operations of first electronic device 110. Such control may involve altering the operating state of first electronic device (e.g., power-down, power-up, restart, etc.), updating or enhancing the functionality of first electronic device 110 (e.g., software updates, patches, etc.), or the like.

According to one embodiment of the invention, prior to the receipt of digital content, second electronic device 120 is to be authenticated in order to ensure that any subsequently received commands from device 120 are recognized as being from a trusted source. According to one embodiment, this may be accomplished through a registration process set forth in FIGS. 1, 2A and 2B.

Figure 2A:
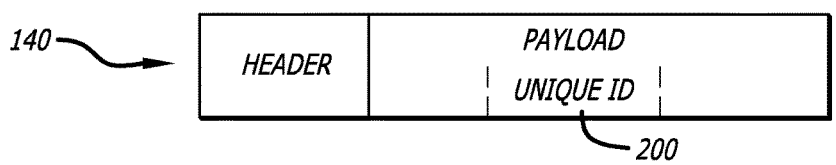
FIG. 2A is an exemplary diagram of an authentication request for the registration process illustrated of FIG. 1.

As shown in FIGS. 1 and 2A, first electronic device 110 transmits an authentication request message 140, which includes a unique identifier 200. As shown for illustrative purposes, unique identifier 200 is placed within a payload 210 of message 140 and represents a value that is unique to first electronic device 110. For instance, as illustrative examples, unique identifier 200 may be a random (or pseudo-random) number produced by a random (or pseudo-random) number generator located within first electronic device 110. Alternatively, unique identifier 200 may be the media access control (MAC) address for the first electronic device 110.

Figure 2B:
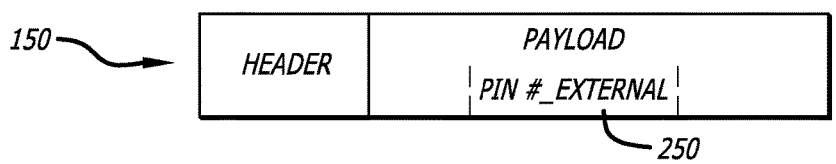
FIG. 2B is an exemplary diagram of an authentication response for the registration process illustrated of FIG. 1.

Upon receipt of authentication request message 140, as shown in FIGS. 1 and 2B, second electronic device 120 extracts unique identifier 200 and performs a logical operation thereon. The "logical operation" may be in accordance with a hash function, one or more arithmetic functions (e.g., (N)XOR, (N)AND, (N)OR, etc.) or any other function that is adapted to produce a result 250 (referred to as "PIN#_External") which can be re-created using unique identifier 200 and that logical operation. PIN#_External 250 is included within authentication response message 150, which is sent from second electronic device 120 to first electronic device 110 after receipt of authentication request message 140. PIN#_External 250 is used for authentication purposes as described below.

Figure 3:
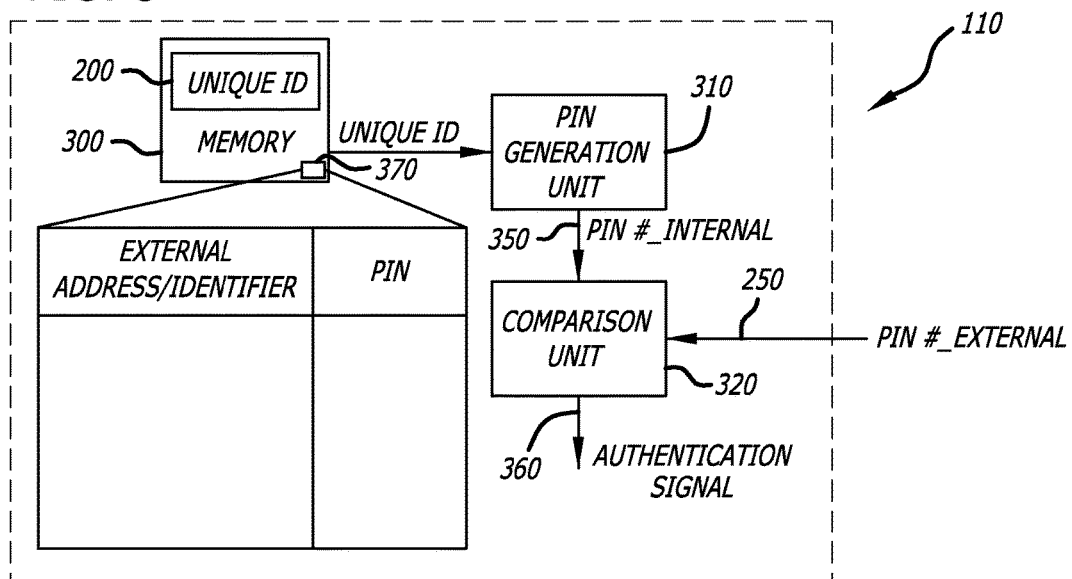
FIG. 3 is an exemplary block diagram of the first electronic device of FIG. 1 that authenticates the second electronic device before execution of the embedded command.

Referring now to FIG. 3, an exemplary block diagram of first electronic device 110 that is adapted to authenticate second electronic device 120 before processing commands within an incoming message is shown. Herein, for handling authentication, first electronic device 110 comprises a memory 300, a PIN generation unit 310, and a comparison unit 320. For greater security, it is contemplated that at least two or all of the noted components, namely memory 300, PIN generation unit 310 and comparison unit 320, may be placed within a single semiconductor or chipset package.

More specifically, according to this embodiment of the invention, memory 300 comprises any type of non-volatile memory (e.g., flash, Read Only memory, battery-backed random access memory, etc.) that can persistently store unique identifier 200. Unique identifier 200 may be pre-stored during manufacture of first electronic device 110 or may be uploaded and securely stored after manufacture. As an example, unique identifier 200 may be a manufacturer identification (ID) value exclusively assigned to device 110 by its manufacture. Alternatively, unique identifier 200 may be the MAC address assigned to a network adapter (not shown) for first electronic device 110 or a random value generated internally by a random (or pseudo-random) number generator (not shown) for subsequent storage in memory 300.

PIN generation unit 310 is logic that is adapted to receive unique identifier 200 and perform logical operations on such data that correspond to those above-described logical operations performed by second electronic device 120. For instance, PIN generation unit 310 may be implemented as a controller that is adapted to perform an operation on input data (e.g., unique identifier 200) in accordance with a particular function. This function may include, but is not limited or restricted to any arithmetic function, a hash function (e.g., any version of Secure Hash Algorithm "SHA" such as SHA-1, SHA-2, etc.), or the like.

Upon performing this operation on unique identifier 200, PIN generation unit 310 produces a result 350 (referred to as "PIN#_Internal"). PIN#_Internal 350 is routed to comparison unit 320 that compares this value with PIN#_External 250 received from second electronic device 120. If these values compare, second electronic device 120 has been authenticated, which may be denoted by authentication signal 360. As a result, an external address or identifier for second electronic device 120, such as an Internet Protocol (IP) address, MAC address or the like, is stored within an entry of a table 370 in memory 300 PIN#_External 250 for comparison purposes for future communications of messages with embedded commands as described below.

Referring back to FIG. 1, after authenticating second electronic device 120, first electronic device 110 is now adapted to receive, identify and process commands embedded within incoming messages 160 from second electronic device 120.

Figure 4:
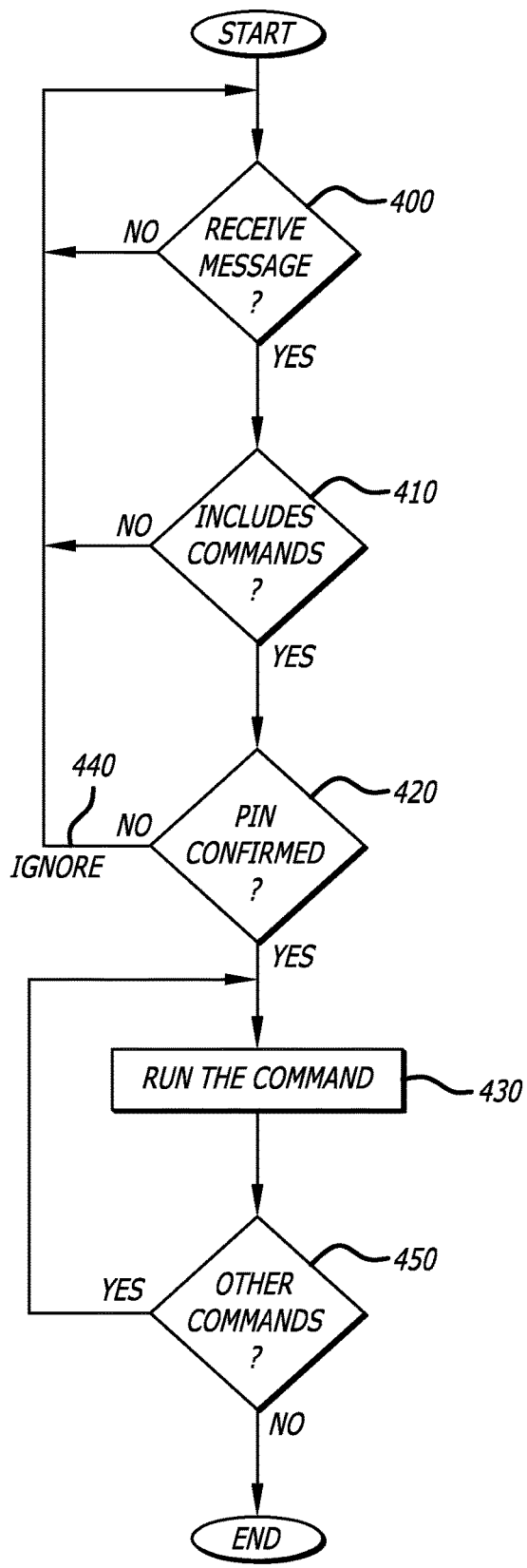
FIG. 4 is an exemplary flowchart illustrating the operations for detecting and processing embedded commands from one electronic device on another electronic device.

Referring now to FIG. 4, an exemplary flowchart illustrating the operations for detecting embedded commands within an incoming message and performing commands from second electronic device 120 on first electronic device 110 is shown. Once communications are made available between the multiple electronic devices (e.g., wireless communications established after association and authentication procedures, wired interconnect plugged into a network adapter of the first electronic device, etc.), the first electronic device monitors for receipt of messages (block 400). Upon receipt of a message, a determination is made as to whether the message includes a command (block 410).

Figure 5A:
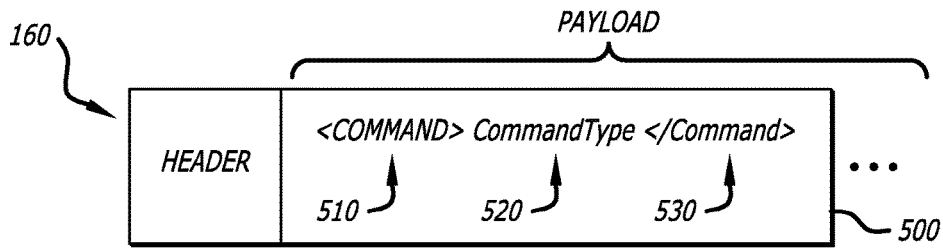
FIG. 5A is a first exemplary diagram of a message including an embedded command as illustrated of FIG. 1.
Figure 5B:
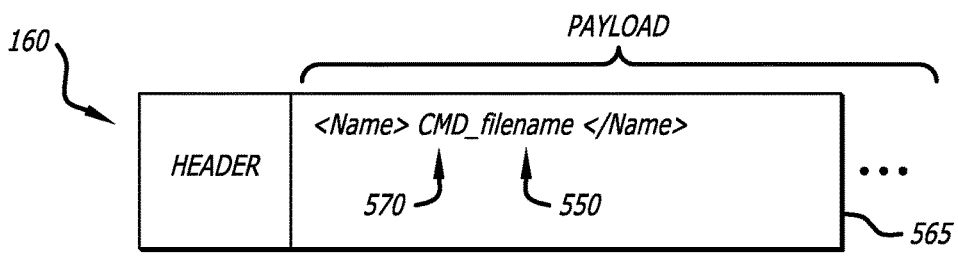
FIG. 5B is a second exemplary diagram of a message including the embedded command as illustrated of FIG. 1.

As shown in FIGS. 5A and 5B, exemplary diagrams of messages including an embedded command are shown. With respect to FIG. 5A, message 160 is embedded with a command 500 which, as illustrated in these embodiments of the invention, is configured with an Extensible Markup Language (XML) based format. In accordance to one embodiment of the invention, command 500 includes an XML opening tag 510, an XML element 520 and an XML closing tag 530.

Herein, XML opening tag 510 is used to identify that the XML information constitutes a command. By analyzing and detecting a "command" type of opening tags within message 160, the first electronic device is able to detect that this message 160 includes an embedded command. The XML closing tag 530 is used to denote an end of the command.

The XML element 520 corresponds to information that identifies the particular type of command. These types of commands may include, but are not limited or restricted to power-down command, a power-on command, a software update command that may simply identify to the first electronic device that a downloadable software update is available, or cause the first electronic device to perform a number of operations (e.g. check version of software, check for patch history, check permissions and other attributes, etc.) before the updated software is accessible by the first electronic device.

As further shown in FIG. 5B, a title 550 of an XML file 560 contained within message 160 may be used to denote the presence of an embedded command. For illustrative purposes, the first electronic device received access to XML file 560, which includes the terminology "CMD_" 570 within title 550. First electronic device detects that the message (XML file 560) includes an embedded command by the presence of the term "CMD_" within the title itself.

These and other techniques may be used to detect that a command is embedded within a received message (block 410).

Referring back to FIG. 4, upon determining that the message includes an embedded command, a determination is made to confirm that the source of the message has been authenticated by the first electronic device (block 420). Such authentication identifies that the source is authorized to control operations of the first electronic device. According to one embodiment of the invention, such authentication is confirmed if the PIN#_Internal (internal value generated from a unique identifier) matches the PIN#_External (value generated by the source of the message based on the unique identifier received from the first electronic device).

If the source (second electronic device) has been authenticated, the embedded command is extracted from the message and executed (block 430). Otherwise, the embedded command is ignored (path 440).

After execution of the embedded command, a determination is made whether the message features other commands (block 450). If so, the next embedded command is retrieved and executed without further authentication as the source of the message has already been authenticated. This process continues until no further commands are detected within the message. At that time, the process ends.

Figure 6:
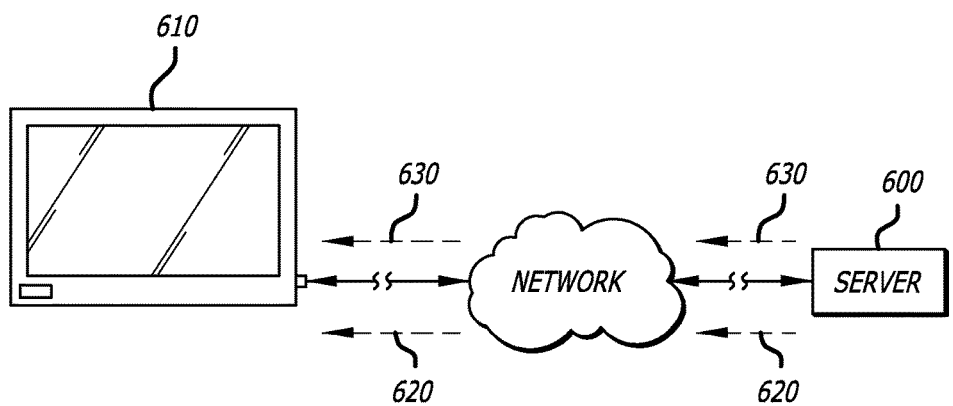
FIG. 6 is an exemplary system diagram of a server transmitting embedded commands to a remotely located electronic device such as a television.

Referring to FIG. 6, an exemplary system diagram of a server 600 (second electronic device) transmitting embedded commands to a television 610 (first electronic device) is shown. Herein, television 610 is adapted to receive digital content 620 (e.g. video, audio, images, web pages, etc.) from server 600 as well as messages 630 including an embedded command. The digital content 620 is transmitted over interconnects 630 that may differ from the interconnects utilized for the transmission of messages 630. For instance, one of digital content 620 and message 630 may be received over a wired interconnect while the other is received over a wireless interconnect (e.g., Bluetooth®, IEEE 802.11 standard-based communications, etc.).

Upon receipt of messages 630, television 610 includes logic that analyzes each of messages 630 to determine if any of such messages includes a command. Upon determining that the message includes an embedded command, logic within television 610 determines if server 600 has been previously. Such authentication may be through value comparisons that assures server 600 is authorized for such communications (e.g. from the same manufacturer as television, television and server are certified by the same entity, etc.).

If server 600 has been authenticated, the embedded command is extracted from the message and executed by logic within television 610. Otherwise, if server 600 has not been authenticated, the embedded command is ignored or the command is temporarily ignored until a registration process is ensued and server 600 is authenticated.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

What is claimed is:

1. A method comprising:
   (A) registering a second device with a first device at least in part by:
       (1) sending from the first device to the second device an authentication request message which includes a value that is unique to first device;
       (2) receiving by the first device from the second device an authentication response message;
       (3) using, by the first device, a logical operation to transform a value in the authentication response message to render a first comparison value;
       (4) determining, by the first device, whether the first comparison value matches a second comparison value internally stored in the first device, the second comparison value not being the value that is unique to first electronic device;
       (5) responsive to determining, by the first device, that the first comparison value matches the second comparison value, storing by the first device an indicator that the second device is an authorized device;

(B) subsequent to registering the second device by the first device:
(1) receiving by the first device at least a first message from the second device;
(2) determining by the first device whether the first message includes a command;
(3) responsive to a determination by the first device that the first message does not contain a command, ignore the command by the first device;
(4) responsive to a determination by the first device that the first message contains a command, determining by the first device whether the second device has been previously authenticated by the first device;
(5) responsive to determining by the first device that the second device has not been previously authenticated, ignoring the command;
(6) responsive to determining by the first device that the second device has been previously authenticated, executing by the first device the command in the first message from the second device;
(7) determining by the first device whether the first message includes a next command; and
(8) responsive to determining that the first message includes a next command, executing the next command without further authentication, wherein processing of the first message by the first device comprises scanning the first message for Extensible Markup Language (XML) opening tag wherein the indicator stored by the first device includes an identifier of the second device and a personal identification number (PIN) code.

2. The method of claim 1, wherein the first message includes an Extensible Markup Language (XML) command.

3. The method of claim 1, wherein the PIN code being a derivative value that can be replicated by performing logical operations on the value that is unique to first device.

4. The method of claim 1, wherein executing the command comprises power-down of the first device.

5. The method of claim 1, wherein executing the command comprises power-up of the first device.

6. The method of claim 1, wherein executing the command comprises restart of the first device.

7. A non-transitory computer readable medium that contains software that, when executed by a processing circuit of a first device, performs operations, comprising:
(A) registering a second device with the first device at least in part by:
(1) sending from the first device to the second device an authentication request message which includes a value that is unique to first device;
(2) receiving by the first device from the second device an authentication response message;
(3) using, by the first device, a logical operation to transform a value in the authentication response message to render a first comparison value;
(4) determining, by the first device, whether the first comparison value matches a second comparison value internally stored in the first device, the second comparison value not being the value that is unique to first electronic device;
(5) responsive to determining, by the first device, that the first comparison value matches the second comparison value, storing by the first device an indicator that the second device is an authorized device;
(B) subsequent to registering the second device by the first device:
(1) receiving by the first device at least a first message from the second device;
(2) determining by the first device whether the first message includes a command;
(3) responsive to a determination by the first device that the first message does not contain a command, ignore the command by the first device;
(4) responsive to a determination by the first device that the first message contains a command, determining by the first device whether the second device has been previously authenticated by the first device;
(5) responsive to determining by the first device that the second device has not been previously authenticated, ignoring the command;
(6) responsive to determining by the first device that the second device has been previously authenticated, executing by the first device the command in the first message from the second device;
(7) determining by the first device whether the first message includes a next command; and
(8) responsive to determining that the first message includes a next command, executing the next command without further authentication, wherein:
the indicator includes an identifier of the second device.

8. The non-transitory computer readable medium of claim 7, wherein the first message includes an Extensible Markup Language (XML) command.

9. The non-transitory computer readable medium of claim 7, wherein the instructions are executable for scanning the first message for Extensible Markup Language (XML) opening tag.

10. The non-transitory computer readable medium of claim 7, wherein the indicator includes a PIN code being a derivative value that can be replicated by performing logical operations on the value that is unique to first device.

11. The medium of claim 7, wherein executing the command comprises restart of the first device.

12. The medium of claim 7, wherein executing the command comprises power up of the first device.

13. The medium of claim 7, wherein executing the command comprises power-down of the first device.

* * * * *